(12) United States Patent
Chang

(10) Patent No.: US 7,367,632 B2
(45) Date of Patent: May 6, 2008

(54) HUB ASSEMBLY FOR DISK BRAKE OF BICYCLE

(75) Inventor: Chung Ming Chang, Tacichung County (TW)

(73) Assignee: Ming Cycle Industrial Co., Ltd., Taichung County (TW)

( * ) Notice: Subject to any disclaimer, the term of this patent is extended or adjusted under 35 U.S.C. 154(b) by 182 days.

(21) Appl. No.: 11/304,952

(22) Filed: Dec. 14, 2005

(65) Prior Publication Data

US 2007/0132306 A1 Jun. 14, 2007

(51) Int. Cl.
*B62L 1/00* (2006.01)
*B62D 27/06* (2006.01)

(52) U.S. Cl. ............... 301/6.8; 301/110.5; 188/24.11; 188/26

(58) Field of Classification Search ............ 301/6.8, 301/6.9, 110.5, 110.6; 188/24.11, 26, 218 XL
See application file for complete search history.

(56) References Cited

U.S. PATENT DOCUMENTS

| | | | | |
|---|---|---|---|---|
| 952,041 A | * | 3/1910 | Hancock | 192/217.3 |
| 4,170,369 A | * | 10/1979 | Strutman | 280/261 |
| 6,371,252 B1 | * | 4/2002 | Kanehisa | 188/26 |
| 6,854,569 B2 | * | 2/2005 | Chen | 188/26 |
| 6,994,189 B2 | * | 2/2006 | Chen | 188/26 |
| 7,044,272 B2 | * | 5/2006 | Takizawa | 188/26 |
| 7,216,743 B2 | * | 5/2007 | Takizawa et al. | 188/26 |
| 2006/0219488 A1 | * | 10/2006 | Chen | 188/26 |
| 2006/0284472 A1 | * | 12/2006 | Chen | 301/6.9 |

* cited by examiner

*Primary Examiner*—Russell D. Stormer
(74) *Attorney, Agent, or Firm*—Banger Shia

(57) ABSTRACT

A hub assembly for a disk brake of a bicycle includes a support shaft, a hub body pivotally mounted on the support shaft and provided with two drum disks, a mounting portion protruding from one of the drum disks, a threaded section protruding from the mounting portion, a brake disk resting on the end face of the mounting portion, and a chainwheel screwed onto the threaded section and pressing the brake disk so that the brake disk is clamped between the mounting portion and the chainwheel closely. Thus, the brake disk is mounted on and detached from the hub body by screwing and unscrewing the chainwheel, so that the hub assembly is assembled and disassembled easily and rapidly, thereby facilitating a user assembling and disassembling the hub assembly.

12 Claims, 7 Drawing Sheets

HUB ASSEMBLY FOR DISK BRAKE OF BICYCLE

BACKGROUND OF THE INVENTION

1. Field of the Invention

The present invention relates to a hub assembly, and more particularly to a hub assembly for a disk brake of a bicycle.

2. Description of the Related Art

A conventional hub assembly for a disk brake of a bicycle in accordance with the prior art shown in FIGS. 6 and 7 comprises a support shaft 50 secured to a seat stay or chain stay (not shown), a hub body 60 pivotally mounted on the support shaft 50 and provided with two drum disks 61 for mounting spokes (not shown), a chainwheel 80 mounted on one of the two drum disks 61 of the hub body 60, a mounting portion 62 protruding from the other one of the two drum disks 61 of the hub body 60 and having a periphery provided with a plurality of protruding blocks 63 each formed with an insertion hole 64, a brake disk 70 mounted on the mounting portion 62 and having a periphery provided with a plurality of protruding plates 75 each resting on the respective protruding block 63 and each formed with a through hole 76, and an urging cap 65 resting on the brake disk 70 and having a periphery provided with a plurality of inserts 66 each extended through the through hole 76 of the respective protruding plate 75 of the brake disk 70 and each inserted into the insertion hole 64 of the respective protruding block 63 to press the brake disk 70 on the hub body 60.

When the brake disk 70 is subjected to a braking force applied by a disk brake (not shown) of the bicycle, the braking force applied on the brake disk 70 is distributed to the mounting portion 62 of the hub body 60 and the urging cap 65. However, the inserts 66 of the urging cap 65 are loosely fit in the insertion holes 64 of the protruding blocks 63, so that the urging cap 65 is easily loosened, and the braking force is concentrated on the inserts 66 of the urging cap 65. Thus, the inserts 66 of the urging cap 65 are easily worn or broken due to a stress concentration, thereby decreasing the lifetime of the hub assembly. On the other hand, when the inserts 66 of the urging cap 65 are closely fit in the insertion holes 64 of the protruding blocks 63, the inserts 66 of the urging cap 65 are easily jammed with the insertion holes 64 of the protruding blocks 63, so that the urging cap 65 cannot removed from the hub body 60 easily.

SUMMARY OF THE INVENTION

The present invention is to mitigate and/or obviate the disadvantage of the conventional hub assembly.

The primary objective of the present invention is to provide a hub assembly, wherein the chainwheel is screwed onto the threaded section and pressing the brake disk so that the brake disk is clamped between the mounting portion of the hub body and the chainwheel closely.

Another objective of the present invention is to provide a hub assembly, wherein when the brake disk is subjected to a braking force applied by a disk brake of the bicycle, the braking force applied on the brake disk is distributed to the mounting portion of the hub body and the chainwheel, so that the braking force is not concentrated on the insertion posts of the resting blocks, thereby preventing the insertion posts of the resting blocks from being worn or broken due to a stress concentration, and thereby enhancing the lifetime of the hub assembly.

A further objective of the present invention is to provide a hub assembly, wherein the brake disk is mounted on and detached from the hub body by screwing and unscrewing the chainwheel, so that the hub assembly is assembled and disassembled easily and rapidly, thereby facilitating a user assembling and disassembling the hub assembly.

In accordance with the present invention, there is provided a hub assembly, comprising a support shaft, a hub body pivotally mounted on the support shaft and provided with two opposite drum disks, a mounting portion mounted on and protruding from a side of one of the two drum disks of the hub body, a threaded section mounted on and protruding from an end face of the mounting portion, a brake disk mounted on the threaded section and having a first side resting on the end face of the mounting portion, and a chainwheel screwed onto the threaded section and pressing a second side of the brake disk so that the brake disk is clamped between the mounting portion and the chainwheel.

Further benefits and advantages of the present invention will become apparent after a careful reading of the detailed description with appropriate reference to the accompanying drawings.

DETAILED DESCRIPTION OF THE INVENTION

Figure 1:
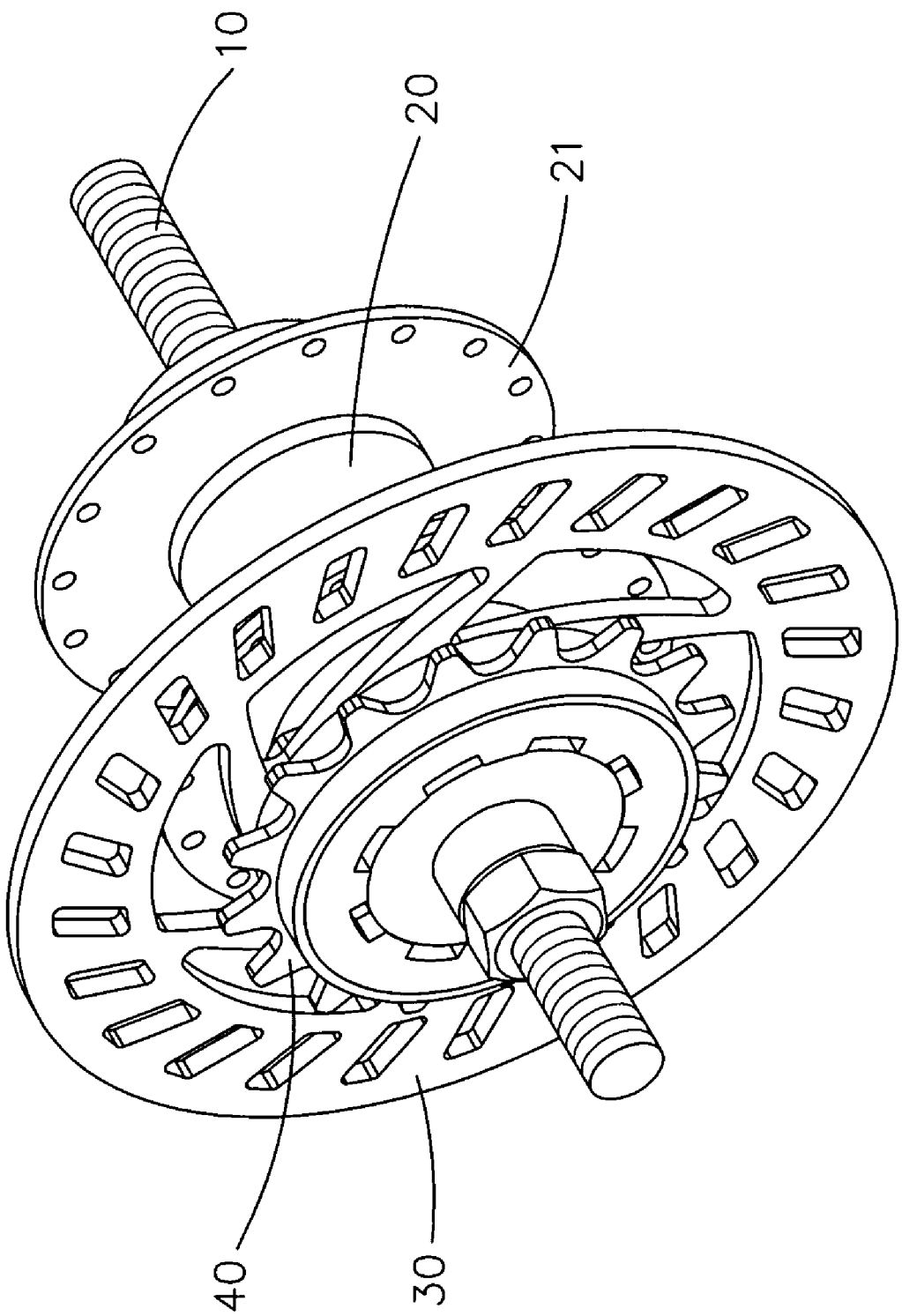
FIG. 1 is a perspective view of a hub assembly in accordance with the preferred embodiment of the present invention.
Figure 2:
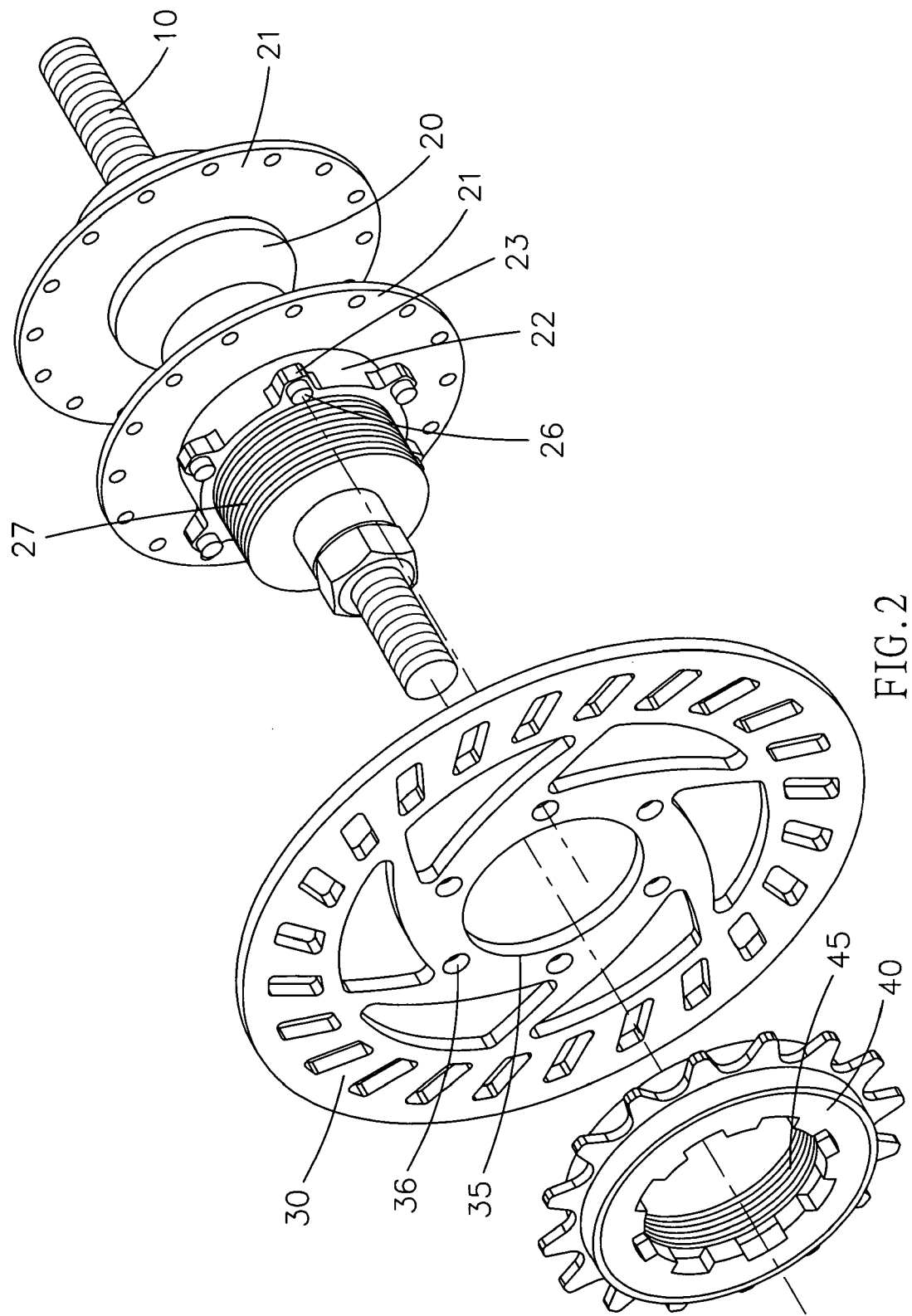
FIG. 2 is an exploded perspective view of the hub assembly as shown in FIG. 1.
Figure 3:
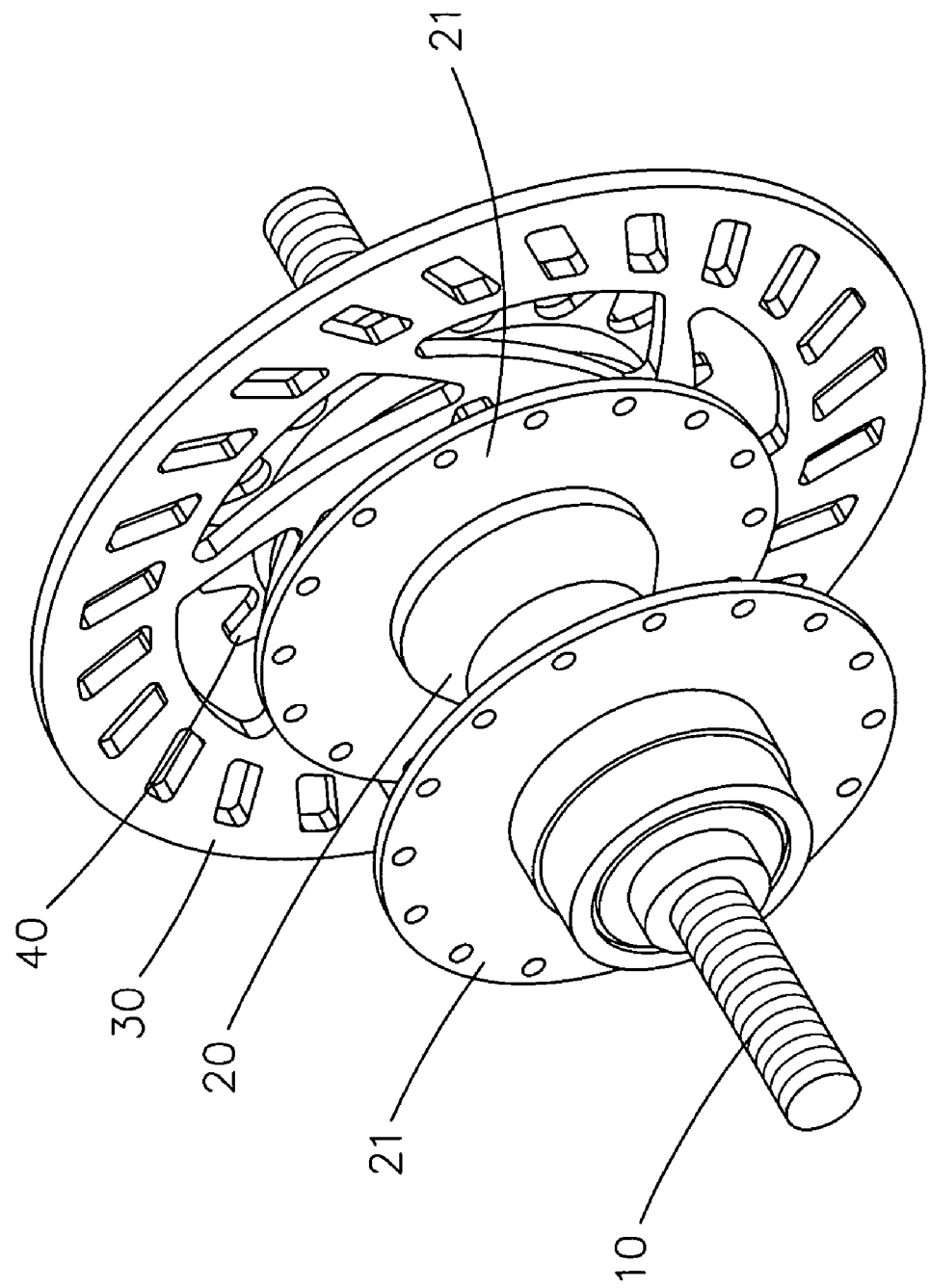
FIG. 3 is another perspective view of the hub assembly in accordance with the preferred embodiment of the present invention.

Referring to the drawings and initially to FIGS. 1-3, a hub assembly for a disk brake of a bicycle in accordance with the preferred embodiment of the present invention comprises a support shaft 10 secured to a seat stay or chain stay (not shown), a hub body 20 pivotally mounted on the support shaft 10 and provided with two opposite drum disks 21 for mounting spokes (not shown), a mounting portion 22 mounted on and protruding from a side of one of the two drum disks 21 of the hub body 20, a threaded section 27 mounted on and protruding from an end face of the mounting portion 22, a brake disk 30 mounted on the threaded section 27 and having a first side resting on the end face of the mounting portion 22, and a chainwheel 40 screwed onto the threaded section 27 and pressing a second side of the brake disk 30 so that the brake disk 30 is clamped between the mounting portion 22 and the chainwheel 40.

The mounting portion 22 has a substantially circular shape. The end face of the mounting portion 22 has a periphery provided with a plurality of protruding resting blocks 23 abutting the first side of the brake disk 30. The resting blocks 23 of the mounting portion 22 are equally spaced from each other. Each of the resting blocks 23 of the mounting portion 22 has an end face provided with an insertion post 26 directed toward the brake disk 30. The insertion post 26 of each of the resting blocks 23 has a substantially circular shape.

The threaded section 27 of the hub body 20 has a diameter smaller than that of the mounting portion 22.

The brake disk 30 has a central portion formed with a through hole 35 to allow passage of the threaded section 27 of the hub body 20. The brake disk 30 has a periphery formed with a plurality of insertion holes 36 to allow insertion of the insertion post 26 of each of the resting blocks 23. The insertion holes 36 of the brake disk 30 are located adjacent to the through hole 35 and are equally spaced from each other.

The chainwheel 40 has a central opening formed with an inner thread 45 to be screwed onto the threaded section 27 of the hub body 20. The inner thread 45 of the chainwheel 40 and the threaded section 27 of the hub body 20 have a screwing direction opposite to a forward travel direction of a wheel (not shown) of the bicycle to prevent the chainwheel 40 from being loosened during movement of the bicycle.

Figure 4:
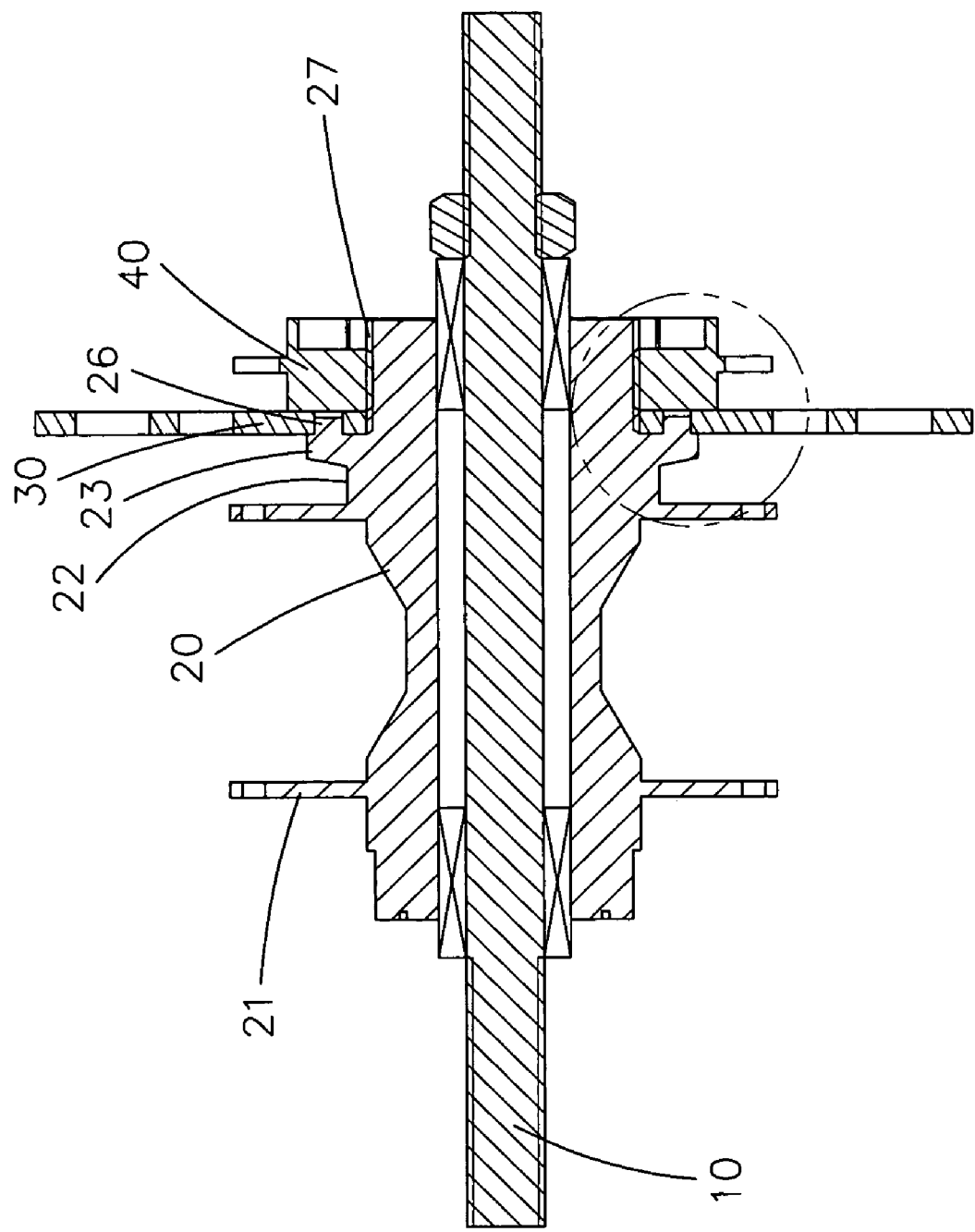
FIG. 4 is a plan cross-sectional view of the hub assembly as shown in FIG. 3.
Figure 5:
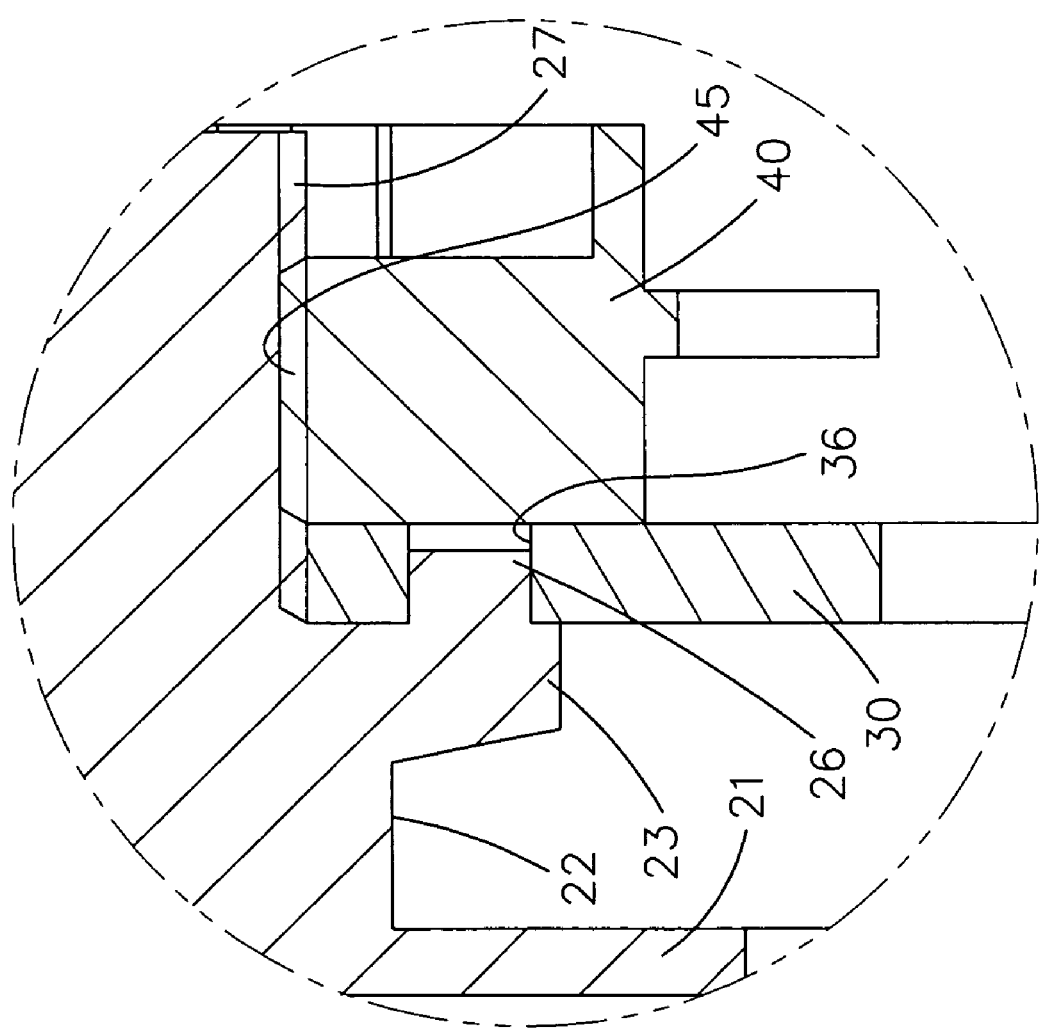
FIG. 5 is a locally enlarged view of the hub assembly as shown in FIG. 4.
Figure 6:
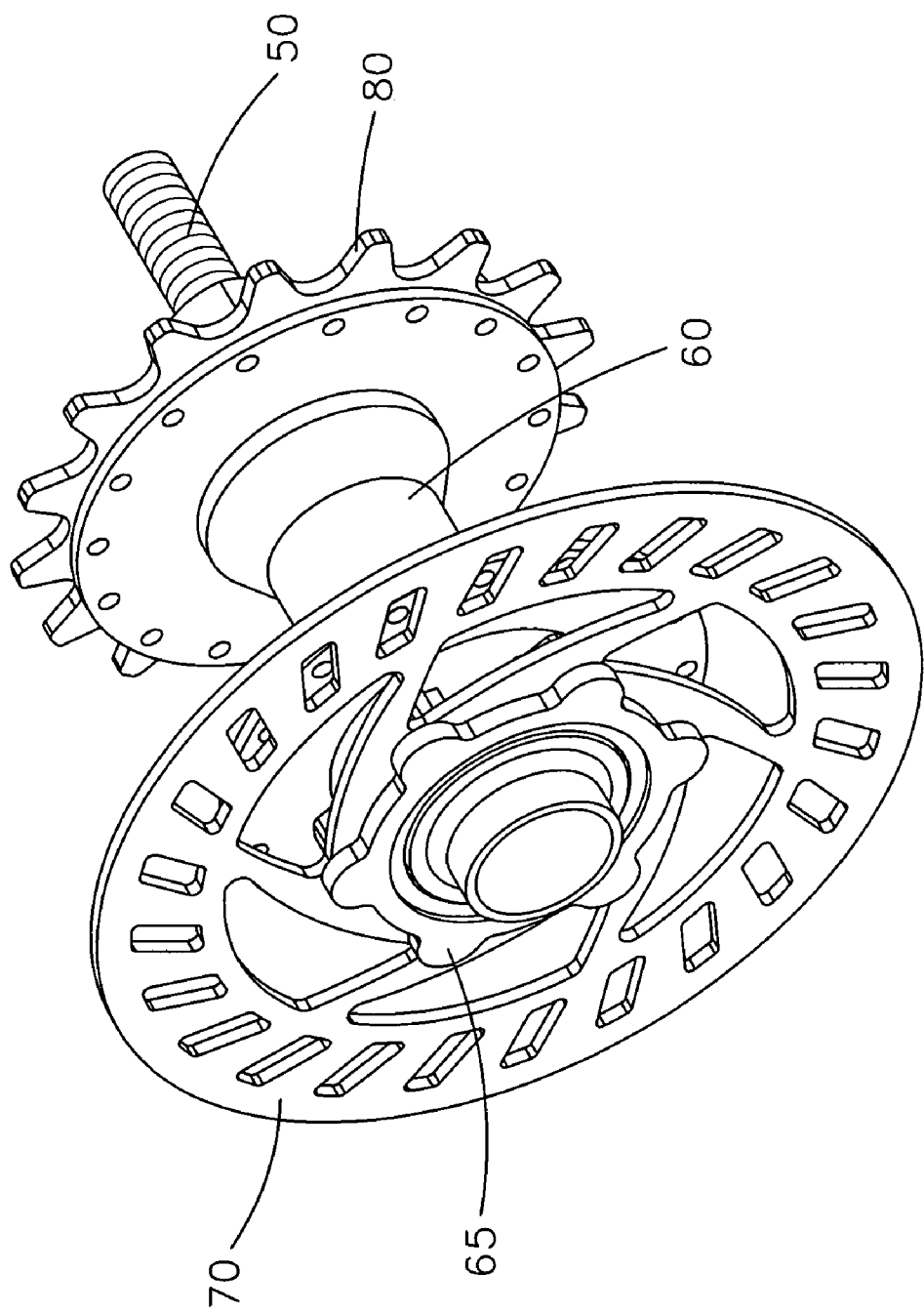
FIG. 6 is a perspective view of a conventional hub assembly in accordance with the prior art.
Figure 7:
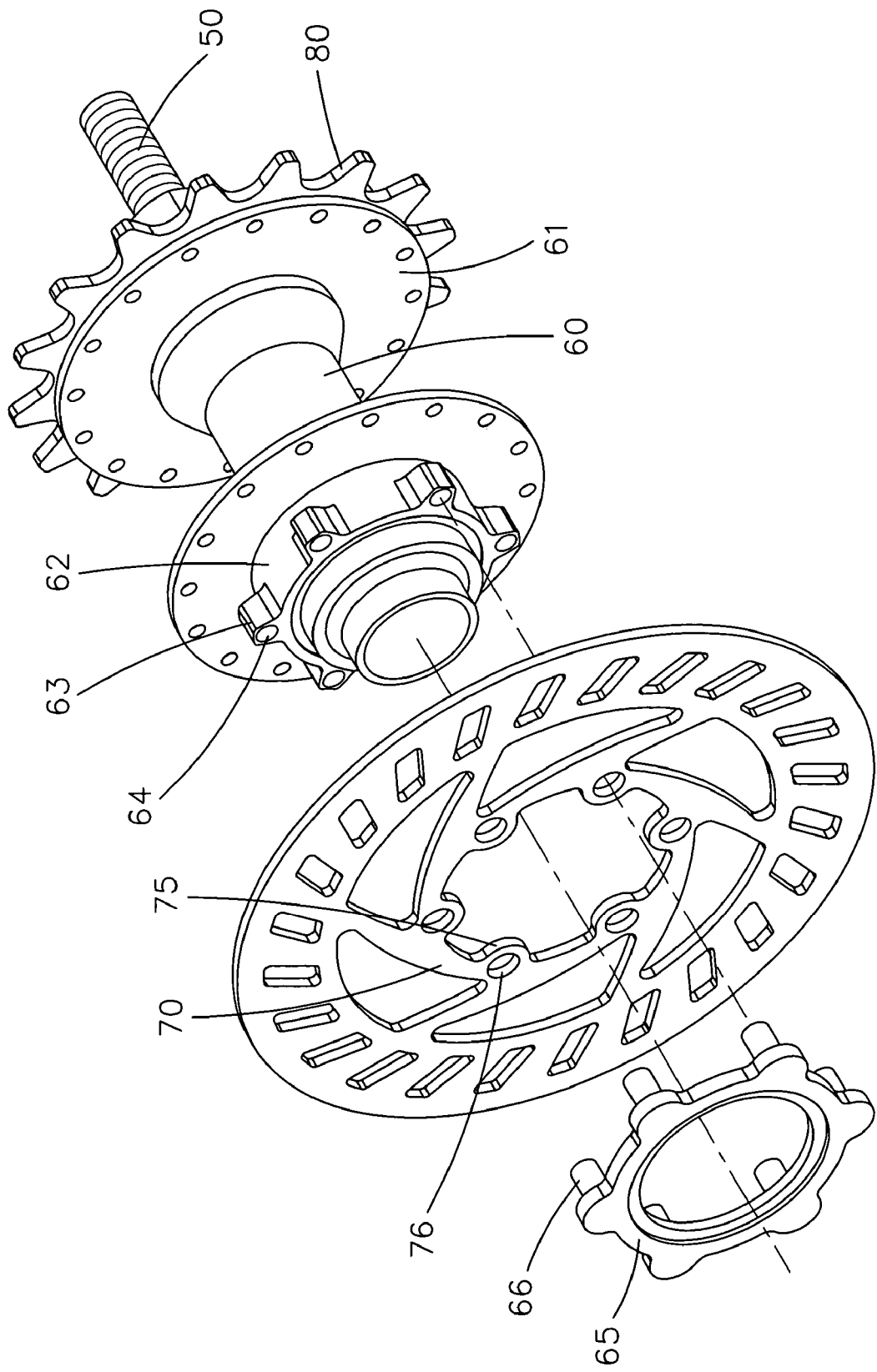
FIG. 7 is an exploded perspective view of the conventional hub assembly as shown in FIG. 6.

As shown in FIGS. 4 and 5, the insertion post 26 of each of the resting blocks 23 has a length smaller than a width of the respective insertion hole 36 of the brake disk 30, so that the insertion post 26 of each of the resting blocks 23 is hidden in and does not protrude from the respective insertion hole 36 of the brake disk 30, and the brake disk 30 is pressed tightly by the chainwheel 40.

Accordingly, the chainwheel 40 is screwed onto the threaded section 27 and presses the brake disk 30 so that the brake disk 30 is clamped between the mounting portion 22 of the hub body 20 and the chainwheel 40 closely. In addition, when the brake disk 30 is subjected to a braking force applied by a disk brake (not shown) of the bicycle, the braking force applied on the brake disk 30 is distributed to the mounting portion 22 of the hub body 20 and the chainwheel 40, so that the braking force is not concentrated on the insertion posts 26 of the resting blocks 23, thereby preventing the insertion posts 26 of the resting blocks 23 from being worn or broken due to a stress concentration, and thereby enhancing the lifetime of the hub assembly. Further, the brake disk 30 is mounted on and detached from the hub body 20 by screwing and unscrewing the chainwheel 40, so that the hub assembly is assembled and disassembled easily and rapidly, thereby facilitating a user assembling and disassembling the hub assembly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A hub assembly, comprising:
   a support shaft;
   a hub body pivotally mounted on the support shaft and provided with two opposite drum disks;
   a mounting portion mounted on and protruding from a side of one of the two drum disks of the hub body;
   a threaded section mounted on and protruding from an end face of the mounting portion;
   a brake disk mounted on the threaded section and having a first side resting on the end face of the mounting portion;
   a chainwheel screwed onto the threaded section and pressing a second side of the brake disk so that the brake disk is clamped between the mounting portion and the chainwheel.

2. The hub assembly in accordance with claim 1, wherein the end face of the mounting portion has a periphery provided with a plurality of protruding resting blocks abutting the first side of the brake disk.

3. The hub assembly in accordance with claim 2, wherein each of the resting blocks of the mounting portion has an end face provided with an insertion post directed toward the brake disk, and the brake disk has a periphery formed with a plurality of insertion holes to allow insertion of the insertion post of each of the resting blocks.

4. The hub assembly in accordance with claim 2, wherein the resting blocks of the mounting portion are equally spaced from each other.

5. The hub assembly in accordance with claim 3, wherein the brake disk has a central portion formed with a through hole to allow passage of the threaded section of the hub body.

6. The hub assembly in accordance with claim 5, wherein the insertion holes of the brake disk are located adjacent to the through hole and are equally spaced from each other.

7. The hub assembly in accordance with claim 1, wherein the mounting portion has a substantially circular shape.

8. The hub assembly in accordance with claim 3, wherein the insertion post of each of the resting blocks has a substantially circular shape.

9. The hub assembly in accordance with claim 1, wherein the threaded section of the hub body has a diameter smaller than that of the mounting portion.

10. The hub assembly in accordance with claim 1, wherein the chainwheel has a central opening formed with an inner thread to be screwed onto the threaded section of the hub body.

11. The hub assembly in accordance with claim 1, wherein the inner thread of the chainwheel and the threaded section of the hub body have a screwing direction opposite to a forward travel direction of a bicycle to prevent the chainwheel from being loosened during movement of the bicycle.

12. The hub assembly in accordance with claim 3, wherein the insertion post of each of the resting blocks has a length smaller than a width of the respective insertion hole of the brake disk, so that the insertion post of each of the resting blocks is hidden in and does not protrude from the respective insertion hole of the brake disk, and the brake disk is pressed tightly by the chainwheel.

* * * * *